US010445413B2

(12) United States Patent
Freund et al.

(10) Patent No.: US 10,445,413 B2
(45) Date of Patent: Oct. 15, 2019

(54) SHARING LINKS WHICH INCLUDE USER INPUT

(71) Applicant: GOOGLE LLC, Mountain View, CA (US)

(72) Inventors: Martin Brandt Freund, Mountain View, CA (US); Yuanying Xie, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/893,531

(22) Filed: Feb. 9, 2018

(65) Prior Publication Data
US 2018/0165259 A1 Jun. 14, 2018

Related U.S. Application Data

(63) Continuation of application No. 14/149,629, filed on Jan. 7, 2014, now Pat. No. 9,928,221.

(51) Int. Cl.
| | |
|---|---|
| *G06F 17/00* | (2019.01) |
| *G06F 17/22* | (2006.01) |
| *G06F 16/93* | (2019.01) |
| *G06F 17/24* | (2006.01) |
| *G06F 16/955* | (2019.01) |

(52) U.S. Cl.
CPC .......... *G06F 17/2247* (2013.01); *G06F 16/94* (2019.01); *G06F 16/9566* (2019.01); *G06F 17/243* (2013.01)

(58) Field of Classification Search
CPC .......... G06F 17/30014; G06F 17/3064; G06F 17/243; G06F 17/2247; G06F 16/94; G06F 16/9566
See application file for complete search history.

(56) References Cited

U.S. PATENT DOCUMENTS

| | | |
|---|---|---|
| 6,589,290 B1 | 7/2003 | Maxwell et al. |
| 6,601,223 B1 | 7/2003 | Puri et al. |
| 6,901,438 B1 | 5/2005 | Davis et al. |
| 7,185,272 B2 | 2/2007 | Pearce et al. |
| 7,216,292 B1 * | 5/2007 | Snapper ................ G06F 17/243 715/234 |
| 7,343,372 B2 | 3/2008 | Chang et al. |
| 7,360,210 B1 | 4/2008 | Vacanti et al. |

(Continued)

*Primary Examiner* — Laurie A Ries
(74) *Attorney, Agent, or Firm* — Morgan, Lewis & Bockius LLP

(57) ABSTRACT

Aspects of the subject technology relate to systems and methods for sharing links which include user input. A first web page is displayed in a web browser, where the first web page is associated with a first universal resource locator and includes at least one input element. One or more user entries are received to form a filled-in web page, where each entry is associated with an input element of the at least one input element. Each received user entry is converted into a respective string value. A second universal resource locator is generated based on the string values and the first universal resource locator, where the second universal resource locator, when processed, generates a second web page corresponding to the first web page and having at least one input element filled in based on the second URL.

19 Claims, 7 Drawing Sheets

(56) References Cited

U.S. PATENT DOCUMENTS

| | | | |
|---|---|---|---|
| 7,392,303 B2* | 6/2008 | Smith | G06F 17/3089 |
| | | | 707/E17.116 |
| 7,512,665 B1 | 3/2009 | Cragun | |
| 7,536,389 B1 | 5/2009 | Prabhakar et al. | |
| 7,797,623 B1 | 9/2010 | Hanevold | |
| 7,877,681 B2 | 1/2011 | Schwarzbauer et al. | |
| 8,041,763 B2 | 10/2011 | Kordun et al. | |
| 8,065,607 B2* | 11/2011 | Abramson | G06F 8/30 |
| | | | 715/235 |
| 8,346,920 B2 | 1/2013 | Rothschild | |
| 8,433,719 B1* | 4/2013 | Choc | G06F 3/0482 |
| | | | 707/768 |
| 8,494,958 B2* | 7/2013 | Schoenberg | G06Q 20/102 |
| | | | 705/35 |
| 8,499,099 B1* | 7/2013 | Kogan | G06F 17/30887 |
| | | | 709/245 |
| 8,527,862 B2 | 9/2013 | Scoda et al. | |
| 8,548,909 B1 | 10/2013 | Snow et al. | |
| 8,600,931 B1 | 12/2013 | Wehrle et al. | |
| 8,799,243 B1 | 8/2014 | Havlik | |
| 8,869,018 B2* | 10/2014 | Wang | G06F 16/954 |
| | | | 715/206 |
| 8,943,566 B2* | 1/2015 | DeLuca | H04W 4/04 |
| | | | 726/7 |
| 9,129,030 B2 | 9/2015 | Bedingfield, Sr. et al. | |
| 9,830,599 B1* | 11/2017 | Khen | G06Q 20/4014 |
| 2001/0013096 A1 | 8/2001 | Luckenbaugh et al. | |
| 2001/0020243 A1 | 9/2001 | Koppolu et al. | |
| 2002/0010709 A1 | 1/2002 | Culbert et al. | |
| 2002/0023108 A1 | 2/2002 | Daswani et al. | |
| 2002/0087560 A1 | 7/2002 | Bardwell | |
| 2002/0111932 A1 | 8/2002 | Roberge et al. | |
| 2002/0116528 A1 | 8/2002 | Vale | |
| 2002/0198908 A1 | 12/2002 | Hartel | |
| 2003/0037232 A1* | 2/2003 | Bailiff | G06F 21/6263 |
| | | | 713/153 |
| 2003/0140007 A1 | 7/2003 | Kramer et al. | |
| 2003/0144843 A1* | 7/2003 | Belrose | H04N 1/00127 |
| | | | 704/270.1 |
| 2004/0030991 A1 | 2/2004 | Hepworth et al. | |
| 2004/0117349 A1* | 6/2004 | Moricz | H04L 67/02 |
| 2005/0005234 A1 | 1/2005 | Chen | |
| 2007/0050283 A1 | 3/2007 | Freeman | |
| 2007/0208714 A1 | 9/2007 | Ture et al. | |
| 2007/0208734 A1* | 9/2007 | Koide | G06F 21/41 |
| 2007/0208755 A1* | 9/2007 | Bhatkar | G06F 21/31 |
| 2007/0245027 A1 | 10/2007 | Ghosh et al. | |
| 2007/0250711 A1* | 10/2007 | Storey | H04W 4/18 |
| | | | 713/168 |
| 2007/0256062 A1 | 11/2007 | Madden | |
| 2007/0283273 A1* | 12/2007 | Woods | G06F 16/95 |
| | | | 715/738 |
| 2008/0120420 A1 | 5/2008 | Sima et al. | |
| 2008/0201201 A1* | 8/2008 | Pousti | G06F 8/60 |
| | | | 705/7.29 |
| 2009/0006646 A1* | 1/2009 | Duarte | G06F 17/243 |
| | | | 709/236 |
| 2009/0089176 A1* | 4/2009 | McCabe | G06Q 20/10 |
| | | | 705/26.1 |
| 2009/0112829 A1 | 4/2009 | Bremer, Jr. et al. | |
| 2010/0005053 A1 | 1/2010 | Estes | |
| 2010/0005069 A1 | 1/2010 | Wang | |
| 2010/0229113 A1 | 9/2010 | Conner | |
| 2011/0219446 A1 | 9/2011 | Ichnowski | |
| 2011/0271173 A1 | 11/2011 | Ait-Mokhtar et al. | |
| 2012/0047021 A1* | 2/2012 | Borchetta | G06Q 30/02 |
| | | | 705/14.66 |
| 2012/0084098 A1 | 4/2012 | Braunstein et al. | |
| 2012/0089659 A1 | 4/2012 | Halevi et al. | |
| 2012/0304292 A1 | 11/2012 | Liu et al. | |
| 2013/0104038 A1 | 4/2013 | Galper et al. | |
| 2013/0132819 A1* | 5/2013 | Zhou | G06F 17/243 |
| | | | 715/234 |
| 2013/0226952 A1 | 8/2013 | Lal et al. | |
| 2013/0317917 A1 | 11/2013 | Harika | |
| 2013/0325611 A1 | 12/2013 | Delug | |
| 2014/0025538 A1 | 1/2014 | Kalgi et al. | |
| 2015/0074141 A1* | 3/2015 | Jones | G06F 16/957 |
| | | | 707/769 |
| 2015/0095753 A1 | 4/2015 | Gajera et al. | |
| 2015/0100483 A1* | 4/2015 | Schoenberg | G06Q 10/10 |
| | | | 705/40 |
| 2015/0170072 A1* | 6/2015 | Grant | G06Q 10/067 |
| | | | 705/7.36 |
| 2015/0193393 A1 | 7/2015 | Violet et al. | |
| 2015/0254361 A1* | 9/2015 | Jenkins | H04L 67/22 |
| | | | 715/234 |

* cited by examiner

SHARING LINKS WHICH INCLUDE USER INPUT

CROSS-REFERENCE TO RELATED APPLICATION

The present application is a continuation application of U.S. patent application Ser. No. 14/149,629 entitled "SHARING LINKS WHICH INCLUDE USER INPUT," filed on Jan. 7, 2014, now U.S. Pat. No. 9,928,221, which is hereby incorporated by reference in its entirety for all purposes.

TECHNICAL FIELD

The present disclosure generally relates to web browsers, and in particular, to sharing links which include user input.

BACKGROUND

Applications, such as web browsers, can be utilized to display a web page with content to be loaded from one or more sources. An application may be displaying on a screen a web page that contains fields for which a user is requested or required to input information. The user may fill in some or all of the fields and then try to share a universal resource locator of the web page with another user. However, there are cases where some, perhaps all, of the information that is input into the web page is not shared with the other user.

SUMMARY

Aspects of the subject technology relate to a computer-implemented method for sharing links which include user input. The method includes displaying a first web page in a web browser, where the first web page is associated with a first universal resource locator and includes at least one input element. The method further includes receiving one or more user entries to form a filled-in web page, where each entry is associated with an input element of the at least one input element. The method further includes, converting each received user entry into a respective string value. The method further includes generating a second universal resource locator based on the string values and the first universal resource locator, where the second universal resource locator, when processed, generates a second web page corresponding to the first web page and having at least one input element filled in based on the second URL.

Aspects of the subject technology relate to a system for sharing links which include user input. The system includes one or more processors and a non-transitory computer-readable medium including instructions stored therein, which, when processed by the one or more processors, cause the one or more processors to perform operations. The operations include displaying a web resource in an application, where the web resource is associated with a first universal resource locator and includes at least one input element. The operations also include receiving one or more user entries to form a filled-in web resource, where each user entry is associated with an input element of the at least one input element. The operations also include converting each received user entry into a respective string value. The operations also include inserting the string values into the first universal resource locator to form a second universal resource locator, where the second universal resource locator, when processed, generates a second web resource based on the filled-in web resource.

Aspects of the subject technology also relate to a non-transitory machine-readable medium including instructions stored therein, which when executed by a machine, cause the machine to perform operations. The operations include receiving a first universal resource locator in a web browser, where the first universal resource locator is associated with a first web page. The first web page includes at least one input element filled with a user entry. The operations also include processing the first universal resource locator to obtain one or more string values and a second universal resource locator, where the second universal resource locator is associated with a second web page. The operations also include converting each string value into a respective user entry, where each user entry is associated with an input element of the at least one input element. The operations also include filling the second web page with each user entry to generate a filled-in web page, where the filled-in web page is based on the first web page.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
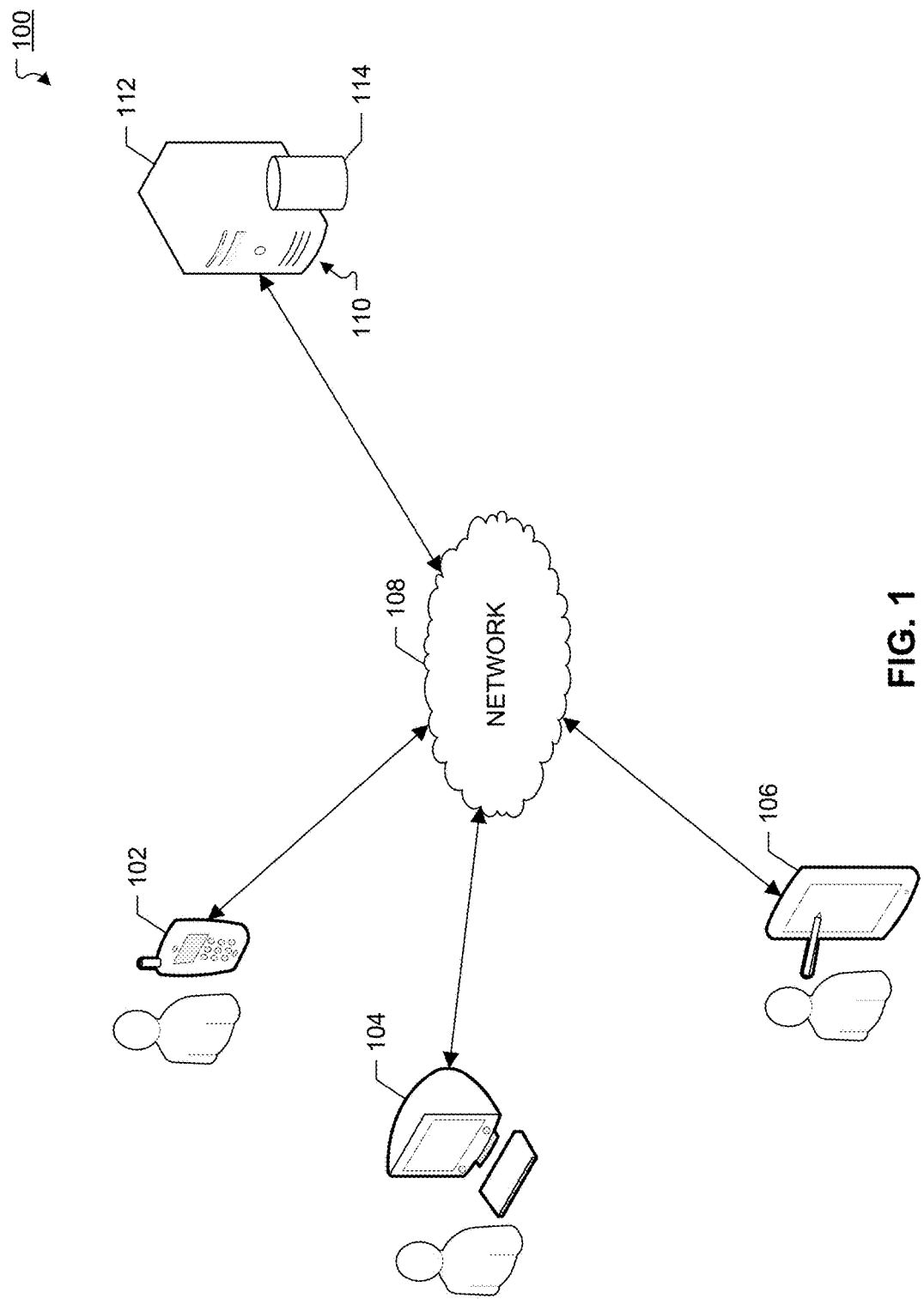
FIG. 1 illustrates an example network environment in which web pages can be provided to web clients and user input can be provided to the web pages.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology allows a user to share a universal resource locator (URL) link which includes a user's input on a web resource, including user inputted text field, data, and form elements on the web resource. The web resource that contains the user's input can be referred to as a filled-in web resource. In one or more implementations, a shared URL link, when processed by an application, generates a second web resource with the user's input such that information is preserved in the URL-sharing process. In these implementations, the web resource generated from processing the shared URL link is identical to the filled-in web resource. In some implementations, the web resource can be a web page. In some implementations, the application can be a web browser.

In one or more implementations, the subject technology allows for defining of particular user input to be omitted from the shared URL links, including information deemed to be sensitive such as financial information and user passwords. For instance, any user input provided in input elements deemed to be associated with such information may be omitted from the shared URL links. As a result of processing a shared URL link devoid of information regarding the omitted user input, the generated web resource does not contain the user input in the corresponding input element of the filled-in web resource (e.g., the input element can be blank, filled in with a default or arbitrary value, and so forth). In some aspects, a user can be presented with a prompt that allows the user to decide whether or not to include the particular user input in the shared URL links. Alternatively or in conjunction, a user can be presented with a prompt that allows the user to decide whether the particular user input can be submitted to and processed by a receiving application (e.g., web browser).

In some implementations, instead of omitting the particular user input from the shared URL link itself, the user input can be processed when the shared URL link is processed to generate a web resource. For example, the corresponding input element can display the user input as encrypted information in the web resource, can omit (e.g., leave blank) the user input in the web resource, or otherwise can change the user input in any predefined or arbitrary manner. The user input can be encrypted using, for example, general, known encryption techniques. In some aspects, whether the receiving application (e.g., web browser) can receive and/or process the user input can depend on a choice made by the user who provided the user input.

To generate a URL link to be shared, a first user on a web resource can provide input into the web resource, such as providing text input into a form field, selecting specific search filters, selecting one or more options in a drop-down menu, and so forth. For example, the first user may be providing input to a web page pertaining to flight information, and the search filters may add or remove criteria by which to search for an appropriate flight or flights for the first user (e.g., number of layovers). Based on inputs of the first user to the web page, a URL can be generated such that, when the URL is processed (e.g., by a web browser of a second user), some or all of the inputs of the first user to the web page are preserved, as indicated previously. The generated URL can be shared by the first user to the second user by means of transmission of information, including electronic messages, emails, physical pieces of paper with the generated URL written out or printed out, and so forth.

As used herein, the terms "input element" and "form field" are used interchangeably and refer to parts of the web resource within which a user can input information. Examples of input elements include, by way of example and not of limitation, text input fields, checkboxes, radio buttons, sliders, dropdown menus, and so forth. In one or more implementations, some input elements in the web resource can be JavaScript elements that can store user input and/or respond to user input, such as updating a form displayed to a user in response to a particular user input being provided by the user to an input element. For example, the user can provide a particular answer to a form field that leads to the form being updated with follow-up questions in response to the particular answer.

FIG. 1 illustrates an example network environment 100 in which web pages can be provided to web clients (e.g., web browsers) and user input can be provided to the web pages. The network environment 100 includes computing devices 102, 104, and 106 (hereafter "102-106") and computing system 110. Computing devices 102-106 and computing system 110 can communicate with each other through a network 108. Computing system 110 can include one or more computing devices 112 (e.g., one or more servers) and one or more computer-readable storage devices 114 (e.g., one or more databases).

In example aspects, any of computing devices 102-106 can be utilized to run a web client (e.g., a web browser) and to display a web page in the web client. The computing device receives web site data that contains data corresponding to the web page. The web page can be retrieved from local memory on computing device 102-106 or can be remotely retrieved (e.g., from computing system 110). The web page can include web content such as text, graphics, links, scripts, and so forth. The web page can also include input elements that can accept user input. The computing device (e.g., 102-106) can display the web page in a view window of the web browser, where the web browser is, in turn, on a screen (e.g., monitor) of the computing device.

Each of computing devices 102-106 can represent various forms of processing devices. By way of example and not of limitation, processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any of these data processing devices or other data processing devices.

In some aspects, the computing system 110 can execute computer instructions stored in data store 114, for example, to host a website which provides a web page. A user of any of computing devices 102-106 can enter a request for the web page on the computing system 110 (e.g., a search request in a case where the computing system 110 is a search engine or a request for user profile content in the case where the computing system 110 hosts a website such as a social networking website). The computing system 110 can provide the web page to the computing device 102-106 that entered the request. The web page can be displayed on a screen (e.g., monitor) of the computing device 102-106 that receives the web page. As noted above, the web page displayed on the client device (e.g., 102-106) is not limited to those from remote website data, and can include local data, remote data, or both local and remote data.

The computing system 110 may be any system or device having a processor, a memory, and communications capability for providing content to the client devices 102-106. In some example aspects, the computing system 110 can be a single computing device (e.g., 112) such as, for example, a computer server. In other implementations, the computing system 110 can represent more than one computing device working together to perform the actions of a computer server (e.g., server farm). Further, the computing system 110 can represent various forms of servers including, but not limited to, a web server, an application server, a proxy server, a network server, or a server farm.

In some aspects, the computing devices, including 102-106 and 110, may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks such as, for example, network 108. Network 108 can be a large computer network such as, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., computing system 110) can occur via a virtual private network (VPN), Secure Shell (SSH) tunnel, or other secure network connection. In some aspects, network 108 may further include a corporate network (e.g., intranet) and one or more wireless access points.

In one or more implementations of the subject technology, a web page can be displayed in a web browser of a first computing device (e.g., 102) that is being utilized by a first user. The web page can be associated with a first URL and can include input elements. User entries (e.g., inputs from the first user) to the input elements of the web page can be received to form a filled-in web page, where each user entry is associated with an input element in the web page. For each user entry, the user entry can be converted into a string value. A second URL can be generated based on the string values and the first URL. The second URL, when processed, can generate a second web page that is based on the filled-in web page. The first user can share the second URL with other users, by transmitting the second URL via email to the other users for example.

In some cases, the first user transmits the second URL to a second computing device (e.g., 104), which is utilized by a second user. In one or more implementations of the subject technology, the second URL is received in a web browser of the second computing device. The URL can be processed to obtain string values. Each string value can be converted into a corresponding user entry, where each user entry is associated with an input element of the web page. Input elements of the web page are filled with a corresponding user entry in the web page to generate a filled-in web page.

Figure 2:
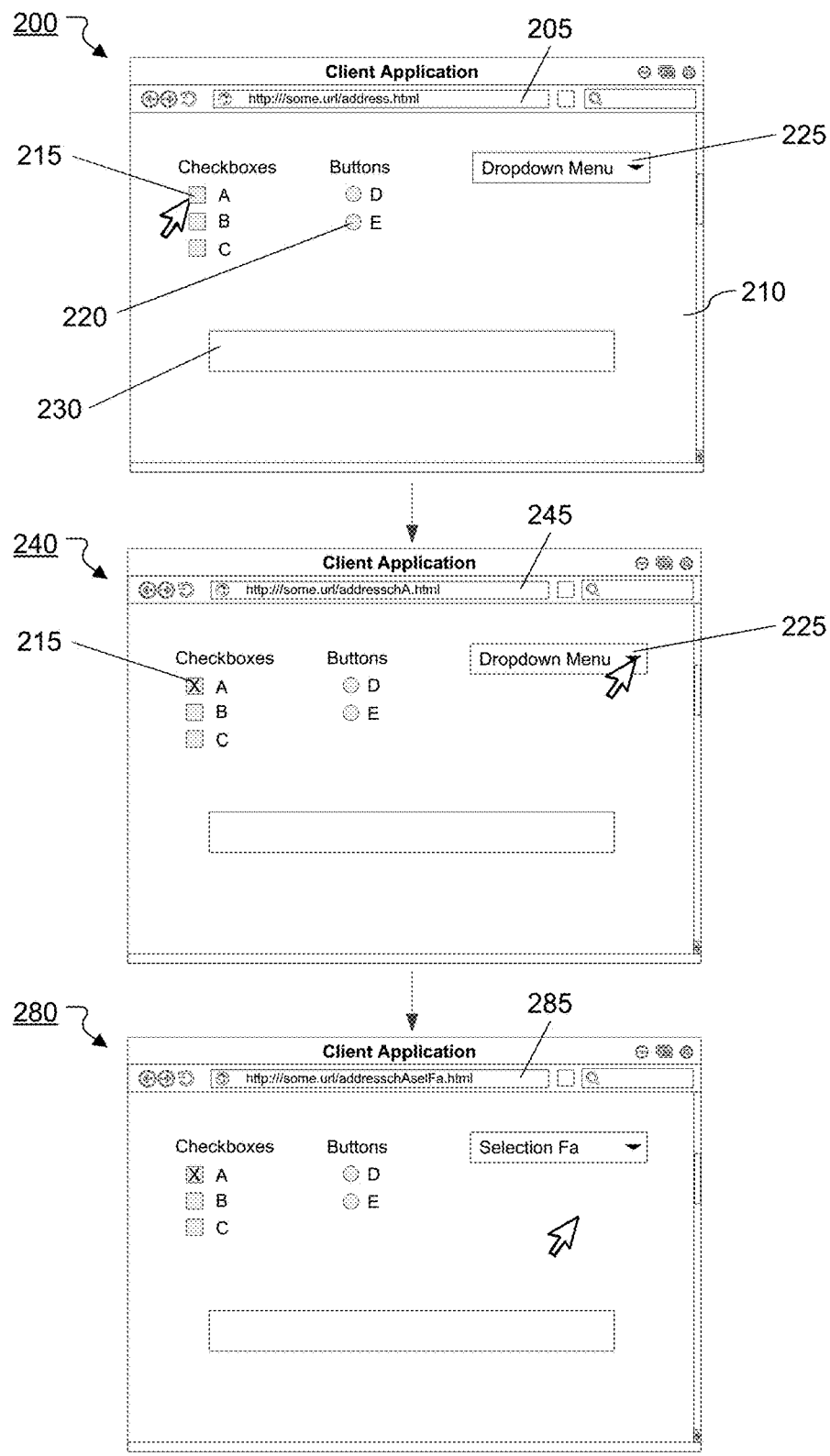
FIG. 2 shows a sequence of web browser interfaces, as displayed on a screen of a client device, that illustrates changing of a universal resource locator dynamically in response to user input, in accordance with various aspects of the subject technology.
Figure 3:
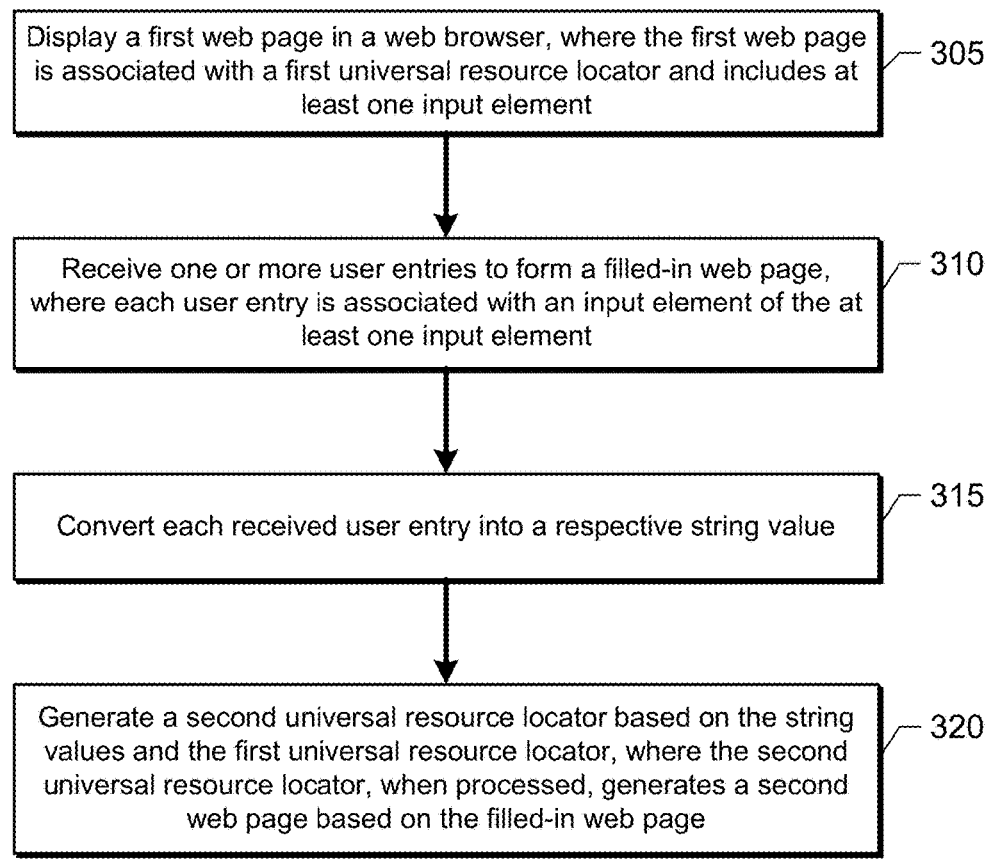
FIG. 3 shows a flowchart illustrating an example process for sharing links which include user input, in accordance with various aspects of the subject technology.

FIG. 2 shows a sequence of web browser interfaces 200, 240, and 280, as displayed on a screen of a client device (e.g., computing device 102), that illustrates changing of a URL dynamically in response to user input, in accordance with various aspects of the subject technology. FIG. 2 will be discussed with reference to FIG. 3. However, FIG. 3 is not limited to the interfaces illustrated in FIG. 2. FIG. 3 shows a flowchart illustrating an example process 300 for sharing links which include user input, in accordance with various aspects of the subject technology. The steps of the process 300 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously.

FIG. 2 shows an example web browser interface 200 in which a first web page is displayed on a screen of a client device. The web browser interface 200 includes interface elements that perform actions when interacted with or executed by the user of the web browser. The interface elements include, among others, an address bar 205 and a display area 210. The address bar 205 is configured to show a URL of the first web page and is configured to accept a URL from the user (e.g., typed in by the user).

As set forth in step 305 of FIG. 3, the first web page is displayed in the web browser, where the first web page is associated with a first URL and includes input elements. As shown in web browser interface 200, the first web page is associated with a first URL, which is displayed in the address bar 205. The first web page is displayed in the display area 210 of the web browser interface 200 and includes input elements including checkboxes (e.g., 215), buttons (e.g., 220), dropdown menu 225, and text input box 230. In one or more implementations, some input elements in the first web page can be JavaScript elements that can store user input and/or respond to user input, such as updating a form displayed to a user in response to a particular user input being provided by the user to an input element.

As set forth in step 310 of FIG. 3, one or more user entries are received to form a filled-in web page, where each entry is associated with an input element of the at least one input element.

As an example, a user of the web browser clicks on a checkbox 215 in the display area 210. The display on the screen of the client device changes from the web browser interface 200 to the web browser interface 240 in response to the clicking of the checkbox 215. The checkbox 215 is shown with an X mark, indicating the checkbox 215 has been selected. Further, for example, the user of the web browser selects a menu option from the dropdown menu 225. The display on the screen of the client device changes from the web browser interface 240 to the web browser interface 280 in response to the selecting of a menu option from the dropdown menu 225. The dropdown menu 225 is shown with "Selection Fa" selected. In the example above, the clicking on the checkbox 215 and the selection of a menu option from the dropdown menu 225 are user entries, and each user entry fills an input element on the web page. The checkbox 215 and the dropdown menu 225 are the input elements associated with the user entries. The user entries can be saved in JavaScript.

As set forth in step 315 of FIG. 3, for each user entry that is received, the received user entry is converted into a respective string value. As set forth in step 320 of FIG. 3, a second URL is generated based on the string values and the first URL where, when the second URL is processed by a web browser, the web browser generates a second web page based on the filled-in web page. In one or more implementations, the second web page corresponds to the first web page and has at least one input element filled in based on the second URL. For example, the second web page can have input elements that correspond to the input elements in the first web page, and the second web page can have one or more of these input elements filled in based on the second URL. In one or more implementations, conversion of the user entries into string values and/or generating of the second URL can be performed by a script, such as JavaScript.

With further reference to the example above, for each user entry, which includes the clicking of the checkbox 215 and the selecting of a menu option from the dropdown menu 225, the user entry is converted into a respective string value. The string value "chA" shown in the web browser interfaces 240 and 280 and the string value "selFa" shown in the web browser interface 280 are provided as examples in FIG. 2.

Based on these string values and the first URL, a second URL is generated. From the web browser interface 200 to 240, for example, the string value "chA" from the user entry of clicking the checkbox 215 is combined with the first URL shown in the address bar 205 to obtain the URL shown in the address bar 245. From the web browser interface 240 to 280, the string value "selFa" from the user entry of selecting a menu option from the dropdown menu 225 is combined with the URL shown in the address bar 245 to obtain the URL shown in the address bar 285. The URLs in each of the address bar 245 and 285 can be referred to as dynamically adjusted or dynamically changed URLs, since the URLs are changed dynamically as a user entry is provided to an input element.

In one or more implementations, for each of the URLs shown in the address bar 245 and 285, when the URL is processed by a web browser, the web browser generates a filled-in version of the web page shown in the web browser interface 200. For example, when the URL in the address bar 245 is processed by the web browser, a filled-in web page is generated with the checkbox 215 selected. As another example, when the URL in the address bar 285 is processed by the web browser, a filled-in web page is generated with the checkbox 215 selected and the menu option "Selection Fa" of the dropdown menu 225 selected.

In any implementation, data associated with each input that a user provides on the web page is saved in a temporary storage location associated with the web browser (e.g., browser cache). The web browser can then take the data and embed the data in the URL. In one or more implementations, each user input can be converted to a string that is inserted into the URL such that the dynamically changing URL is longer than the URL prior to inserting the strings (e.g., as shown above in FIG. 2).

In one or more implementations, a longer URL, such as the dynamically changed URL, can be processed to obtain a shortened URL, where the shortened URL is provided to a user to be shared. For instance, when a user transmits a URL via email to another user, the URL that is transmitted is the shortened URL. The shortened URL, when processed by a web browser, can send the web browser to a web page that redirects the web browser to a web page associated with the longer URL. A shortened URL can be a unique identifier generated by the web browser, such that the shortened URL maps or redirects to a particular longer URL.

The web browser can map information associated with each user input into a string, where, for example, the web browser generates a string based on one or more of the user input in the form field (e.g., a checked box, inputted text, slider input, etc.), type of form field, location of the form field on the web page, and so forth. For example, the string can be defined to include "ch" whenever a checkbox (e.g., 215 in FIG. 2) is clicked as well as include a value associated with the checkbox (e.g., value A associated with checkbox 215 in FIG. 2), thus resulting in the example string "chA" shown in the address bar 245 in FIG. 2. Alternatively or in conjunction, the strings can be inserted into the URL as strings separated by a parameter, character, or symbol, such as a question mark "?" symbol.

In one or more implementations, the strings associated with (e.g., converted/generated from) the user entries can be pieces of code (e.g., JavaScript code) that are combined with the first URL to form the second URL. When the second URL is processed by a web browser, the web browser can extract the pieces of code from the second URL (e.g., by parsing the second URL) and process the pieces of code to generate a web page that is filled in with the user input utilized to generate the second URL. In some implementations, the web browser can include a compiler that translates the pieces of code in the second URL into a language suitable for the web browser to process.

Each piece of code can be associated with one or more input elements in a web page. The pieces of code, when processed, can identify corresponding input elements and interact with the corresponding input elements (e.g., fill in with text for a text input box, click for a checkbox) to generate a filled-in web page similar, and in some implementations identical, to the web page as filled in by the first user. As previously indicated, the second URL may omit user entries associated with certain input elements and/or the user entries may be adjusted (e.g., omitted, encrypted) when the second URL is processed to generate the filled-in web page. In implementations where a shortened URL is provided to a user for sharing, the shortened URL, when processed, can redirect the web browser to a particular longer URL, where the longer URL contains the pieces of code to be processed to generate the filled-in web page.

It is understood that the strings above are provided by way of example and not of limitation, and that other strings are possible. For example, the strings need not follow any set rules, such as a rule that defines any string associated with a user entry in a checkbox to include the string "ch". Similarly, the strings need not provide any recognizable (e.g., to a user) correspondence between the generated URL and the user entry itself, where an example of a possibly recognizable correspondence can be a string such as "chA" for indicating a checkbox associated with a value of A as shown in FIG. 2.

Furthermore, it is understood that FIG. 2 provides one example implementation of generating a URL by concatenating the strings associated with the user entries together and combining the concatenated string with the first URL in the address bar 205. Other ways to combine the strings with each other as well as with the first URL are possible.

In one or more implementations, with each input a user provides on a web page, the URL of the web page is dynamically changed in real time to reflect the input, such as shown going down sequentially through the web browser interfaces 200, 240, and 280 in FIG. 2. Alternatively, the user input causes dynamic adjustment of the URL when the web page refreshes (e.g., user instruction to refresh, automatic refresh every few seconds, etc.). The user input can also cause dynamic adjustment of the URL when the user initiates a copy command, such as when the user copies the URL in order to later paste the URL (e.g., to share the URL with another user).

In conjunction with or alternative to these implementations, a predefined action can be performed by the user that instructs the web browser to take user entries in the filled-in web page to generate a URL that, when processed, generates a web page based on the filled-in web page. A predefined action can include such actions as a user of the web browser selecting a menu option provided by the web browser; the user pressing a key or sequence of keys on a keyboard; the user performing a particular touch-input, gesture, or mouse input; and so forth.

In one or more implementations, the user providing the input on the web page may be able to see the URL in the address bar dynamically changing, whether it be in real time or at intervals (e.g., fixed intervals) when the web page refreshes. In one or more implementations, the changes to the URL need not be displayed to the user. For example, the URL itself or the changes to the URL might not be of interest to the user, and, by default of the web browser, the first URL (e.g., in address bar 205 in FIG. 2) may continue to be displayed to the user as the user is providing input to the input elements. In some cases, the URL may be dynamically adjusting in the backend (e.g., in browser cache) even if the dynamic adjustment is not displayed to the user.

In any implementation, once a first user has input the entries into the web page, the first user can initiate a copy command to save a resulting URL, which reflects the user entries on the web page, to a temporary storage location associated with the web browser (e.g., browser cache). In some implementations, the initiating of the copy command on a URL can convert any remaining user entries not yet reflected in the URL to strings that are inserted into the URL to form the resulting URL. For example, a Copy Special action can be defined such that when the Copy Special action is selected by the first user to copy the URL, the remaining user entries not yet reflected in the URL are converted to strings and inserted into the URL to form the resulting URL.

In some implementations, the URL displayed to a user is not the resulting URL, where the resulting URL includes information pertaining to the user entries. A regular copy action (such as when a user presses Ctrl+C) can be defined to copy the URL displayed to the user whereas a Copy Special can be defined to copy the resulting URL. In some implementations, the Copy Special action can also process the resulting URL to obtain a shortened URL, where the shortened URL, when processed, can send a web browser to a web page that redirects the web browser to the resulting URL. The Copy Special action can be defined such that it can be initiated by the first user by performing an action such as a Ctrl+C action, a right click and select copy action, a menu-based copy action, or any other copy action. The Copy Special action can be defined as the default copy action (such as when a user presses Ctrl+C) in some cases.

In any implementation, the resulting URL can then be pasted by performing a corresponding Paste Special, where the Paste Special action can be defined such that it can be initiated by the first user by performing an action such as a Ctrl+V action, a right click and select paste action, a menu-based paste action, or any other paste action. The Paste Special action can be defined as the default paste action (such as when a user presses Ctrl+V) in some cases. The resulting URL may be pasted into an email, for example, such that the first user can share the resulting URL with another user. Once processed, the resulting URL generates a web page with the input provided by the first user. In some implementations, the resulting URL is processed to determine the user input associated with each input element, type of each input element, location of each input element on the web page, and so forth. For example, the resulting URL can be parsed to obtain data corresponding to input elements in the web page. In some implementations, the Paste Special can process the resulting URL to obtain a shortened URL, where the shortened URL, when processed, can send a web browser to a web page that redirects the web browser to the resulting URL.

In some cases, the dynamically created URL can be utilized by the first user. For example, upon completing a page of a form on the web page (e.g., filling out input elements and pressing a "Submit" button on the web page), where the completed page generates a first dynamically created URL, the first user may realize the page of the form has an error and desire to correct the error. The first user can press an interface element of the web browser (e.g., a back button of the web browser) or can otherwise process the first dynamically created URL in the web browser (e.g., paste the first dynamically created URL into an address bar of the web browser and process the first dynamically created URL) to return to the completed page corresponding to the first dynamically created URL and adjust the page as desired. The adjusted page of the form can generate a second dynamically created URL in view of one or more different user entries relative to the first dynamically created URL.

Figure 4:
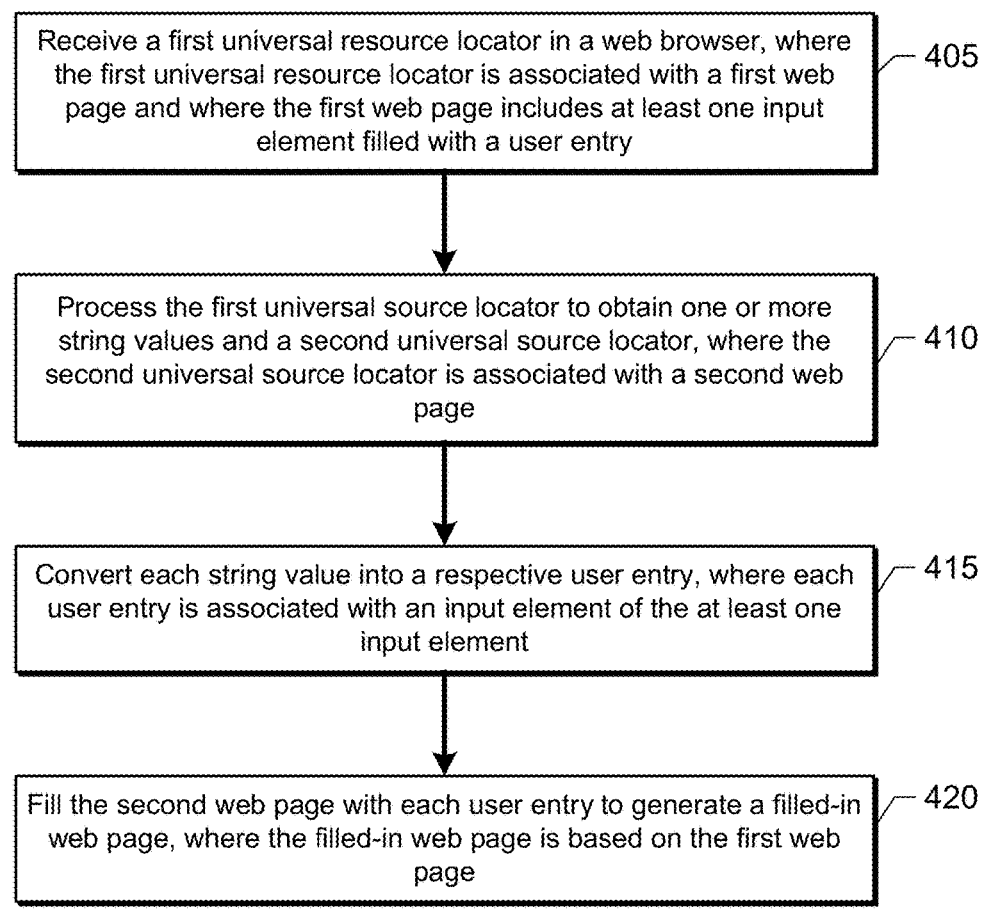
FIG. 4 shows a flowchart illustrating an example process for processing of received shared links which include user input, in accordance with various aspects of the subject technology.

FIG. 4 shows a flowchart illustrating an example process 400 for processing of received shared links which include user input, in accordance with various aspects of the subject technology. The steps of the process 400 do not need to be performed in the order shown. It is understood that the depicted order is an illustration of one or more example approaches, and are not meant to be limited to the specific order or hierarchy presented. The steps can be rearranged, and/or two or more of the steps can be performed simultaneously.

As set forth in step 405 of FIG. 4, a URL is received in a web browser of a computing device (e.g., 104 in FIG. 1). The URL is associated with a web page, and the web page includes at least one input element that is filled with a user entry. The URL can be, for example, the second URL described in FIG. 3.

As set forth in step 410 of FIG. 4, the received URL is processed by the web browser to obtain one or more string values and a base URL. The base URL can be associated with the web page corresponding to the received URL, except devoid of any user entries. For example, the base URL can be the first URL described in FIG. 3. The processing can include parsing the URL to extract the string values. For example, in a case where string values are separated by a symbol (e.g., a question mark "?" symbol), each string value can be identified by identifying the symbol adjacent to the string value.

As set forth in step 415 of FIG. 4, each string value is converted into a respective user entry, where each user entry is associated with an input element of the web page corresponding to the received URL. The web browser can map the string value to a user entry. As previously indicated, each string value has a corresponding input element. The string value can contain information related to one or more of user input in the input element, type of input element, location of the input element on the web page, and so forth.

In one or more implementations, the string values are pieces of code (e.g., JavaScript code) that can be extracted from the URL and processed. For a string value associated with a particular input element and corresponding user entry, the particular string value can be processed to generate a web page that is filled in with the same user entry in the particular input element that was utilized to generate the particular string value in the URL. The particular string value can instruct filling in of the particular input element. In some cases, the particular string value can fill in the particular input element.

As set forth in step 420 of FIG. 4, input elements of a web page corresponding to the base URL are filled with respective user entries to generate a filled-in web page. The filled-in web page is based on the web page corresponding to the received URL. In any implementation, the user entries can be generated from the string value and utilized to fill in corresponding input elements on the web page. The user entries can also be saved in a temporary storage location associated with the web browser (e.g., browser cache), where the web browser can then take the user entries from the temporary storage location and fill in the corresponding input elements on the web page corresponding to the base URL.

Figure 5:
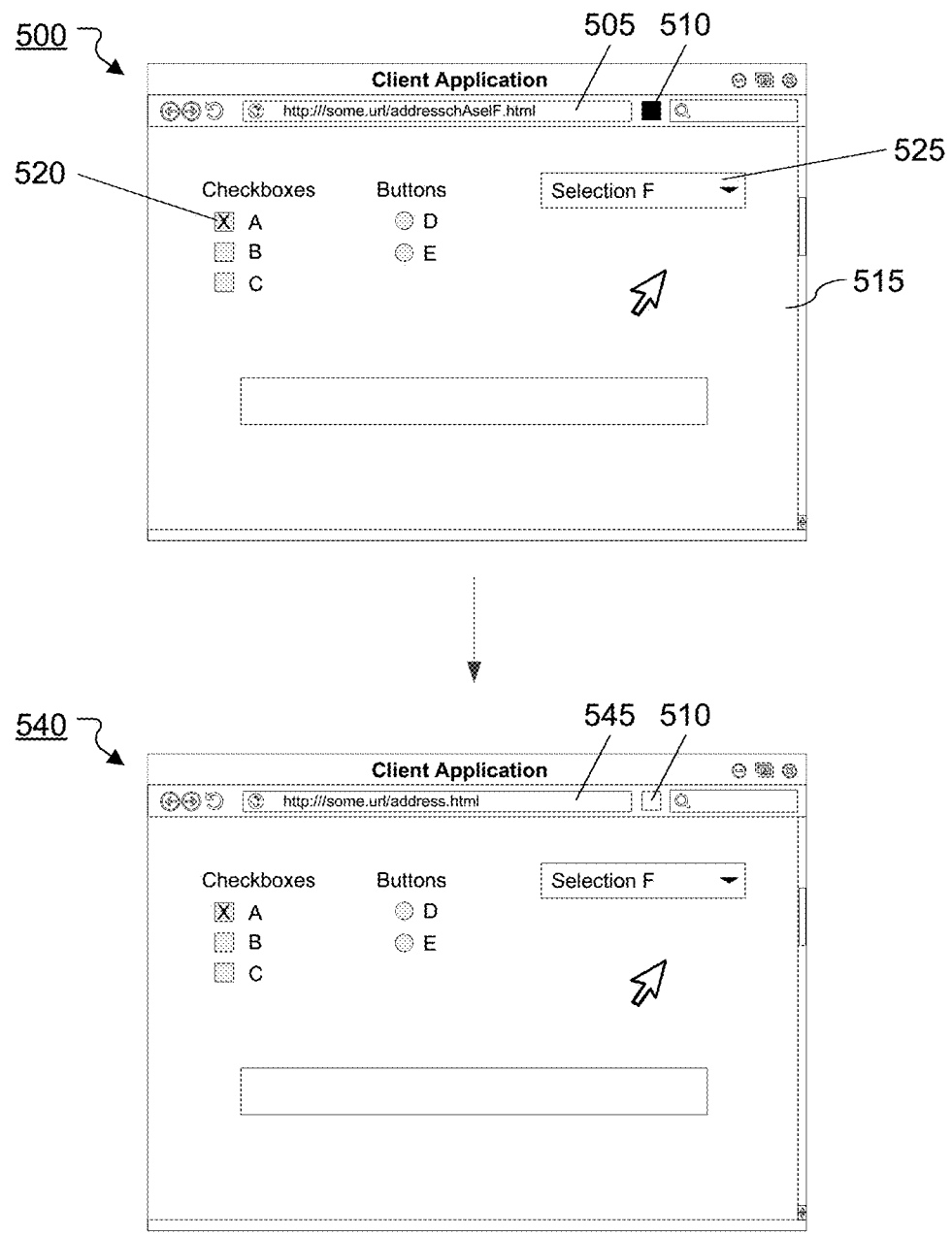
FIG. 5 shows a sequence of web browser interfaces, as displayed on a screen of a client device, that includes a toggle button, in accordance with various aspects of the subject technology.

FIG. 5 shows a sequence of web browser interfaces 500 and 540, as displayed on a screen of a client device (e.g., computing device 102), that includes a toggle button 510, in accordance with various aspects of the subject technology. The toggle button 510 can be provided to the user (e.g., in the web browser interface as shown in FIG. 5) such that the user can switch between displaying and not displaying the dynamically changing URL. In the web browser interface 500, the toggle button 510 is in a first state (e.g., a selected state). An address bar 505 displays a URL to the user and a display area 515 displays a web page. The web page includes user entries in a checkbox 520 and a dropdown menu 525, and the user entries are reflected in the URL in the address bar 505.

In the web browser interface 540, the toggle button 510 is in a second state (e.g., an unselected stage). An address bar 545 displays a URL to the user, where the URL does not reflect the user entries. In one or more implementations, when the user initiates a copy command on either the URL in the address bar 505 or 545, the URL that is temporarily stored is generally the dynamically adjusted URL shown in the address bar 505. Other implementations for allowing a user to switch between displaying and not displaying the dynamically changing URL can be provided, either in conjunction with or alternative to the toggle button 510. Menu items, such as those presented to a user when the user clicks (e.g., right clicks) a mouse button, can be provided to toggle displaying and not displaying the dynamically changing URL upon selection by a user, for example.

Figure 6A:
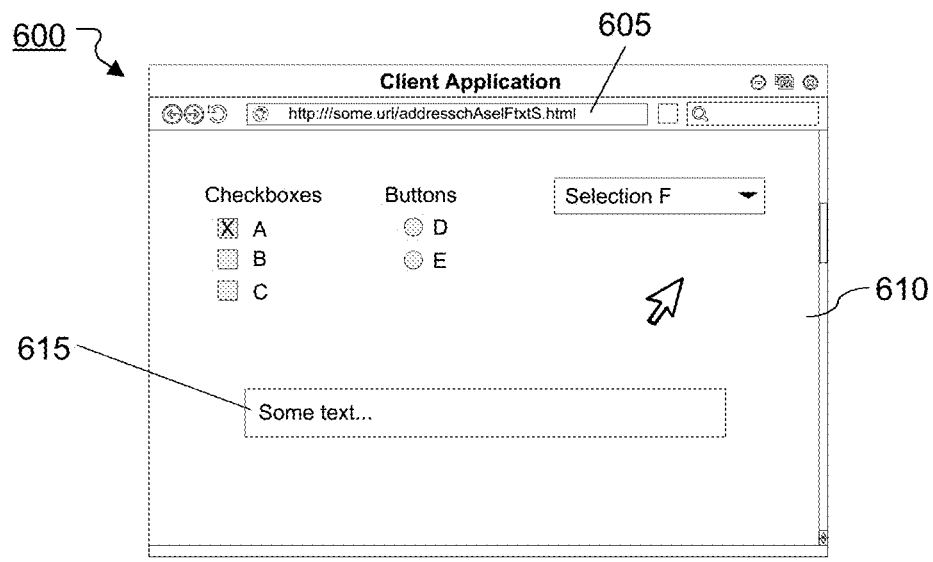
FIG. 6A shows a web browser interface with a filled-in web page in a first web browser, in accordance with various aspects of the subject technology.

FIG. 6A shows a web browser interface 600 with a filled-in web page in a first web browser, in accordance with various aspects of the subject technology. The web browser interface 600 includes an address bar 605 with a URL that has been dynamically adjusted based on user entries on the web page. The web browser interface 600 also includes a text input box 615 with input text data, among other input elements. The URL in the address bar 605 can be shared (e.g., with another user).

Figure 6B:
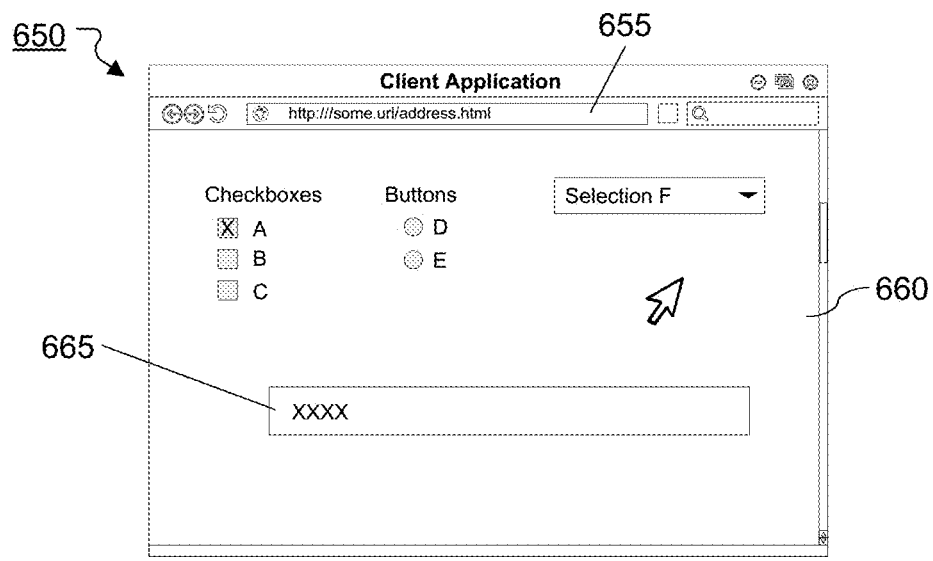
FIG. 6B shows a web browser interface with a filled-in web page as rendered by a second web browser upon processing the universal resource locator in the address bar of the web browser interface, in accordance with various aspects of the subject technology.

FIG. 6B shows a web browser interface 650 with a filled-in web page as rendered by a second web browser upon processing the URL in the address bar 605 of the web browser interface 600, in accordance with various aspects of the subject technology. It is noted that an address bar 655 of the web browser interface 650 can either reflect the first URL or the dynamically adjusted URL (not shown) utilized to generate the filled-in web page. The web browser interface 650 also includes a text input box 665. Text in the text input box 665 is not identical to text in the text input box 615 in FIG. 6A.

In one or more implementations, the shared URL links, when processed, generates a web page with a user's input such that information is preserved in the URL-sharing process. In some implementations, particular user entry can be omitted (e.g., left blank) from the filled-in web page, including information deemed to be sensitive such as financial information and user passwords. In some implementations, instead of omitting the particular user entry, the particular user entry can be provided as encrypted information or otherwise information not identical to the particular user entry, such as shown in text input box 665 in FIG. 6B. In one or more implementations, the particular user entry can be omitted when generating the dynamically changed URL. For example, a user entry is not converted to a string value in step 315 of FIG. 3 and, accordingly, does not factor into the dynamically changed URL that is generated in step 320 of FIG. 3.

In one or more implementations, when a user is copying and/or pasting a dynamically changed URL, the user may be provided with a prompt indicating that the dynamically changed URL contains possibly sensitive information. The prompt may include an option to the user to indicate whether or not to proceed with the copying or pasting. In some implementations, the user can provide instructions on which user entries to not embed in the dynamically changed URL. Alternatively or in conjunction, the user can provide instructions on which user entries to embed in the dynamically changed URL but, when the dynamically changed URL is processed, to present encrypted information in place of the user entries. Other ways to customize or define which user entries to embed in the URL and/or display in the web page when the URL is processed are possible.

In one or more implementations, the subject technology allows for defining of particular user input to be omitted from the shared URL links, including information deemed to be sensitive such as financial information and user passwords. For instance, any user input provided in input elements deemed to be associated with such information may be omitted from the shared URL links. In some implementations, instead of omitting the particular user input from the shared URL link itself, the user input can be processed when the shared URL link is processed to generate a web resource (e.g., web page). For example, the corresponding input element can display the user input as encrypted information in the web resource, can omit (e.g., leave blank) the user input in the web resource, or otherwise can change the user input in any predefined or arbitrary manner.

Identification of information as being sensitive information can depend on a variety of factors, and examples are provided as follows. The identification can be based on metadata associated with a web resource (e.g., a website or web page). The identification can be based on metadata, such as metatext, associated with a field that contains user inputted data. For example, fields associated with phrases such as "Credit card information", "Payment details", "Password", "Account number", "Birth date", and so forth can be considered fields that contain sensitive information. The identification can also depend on type of website and/or type of HTML. For example, user input in bank websites, brokerage account websites, email account websites, and so forth and secured pages such as "https://" can factor into classifying a field as containing sensitive information.

In any given web resource, a field with user inputted data that is encrypted (e.g., displayed as *** symbols to the user) can be identified as a field containing sensitive information. Additionally, a field that involves sequences of user inputted keystrokes that resemble typical sensitive pieces of data such as credit card numbers, phone numbers, birth dates, passwords containing combinations of keys (e.g., upper case, lower case, numbers, symbols) can be identified as a field pertaining to sensitive information. Data fields where a user has to enter identical information twice in two separate fields to verify accuracy (e.g., "Enter your account number" and "Re-enter your account number") can be identified as fields pertaining to sensitive information.

The identification of information as being sensitive information can depend on a variety of factors with examples as provided above. The above are examples, and other manners or metrics by which to identify a field or fields as pertaining to sensitive information can be utilized. In one or more implementations, the user or the application can set a threshold level for identifying whether a field pertains to sensitive information. For example, some users might not consider a birth date as sensitive information whereas other uses might, and the users' shared URL links or the processing on the shared URL links performed by a receiving application can be dependent on preferences of the users who shared the URL links.

As an example, a user can be a parent booking a flight for the user's child, and the shared URL link includes flight information as well as credit card information. The user can share the URL link with the user's child such that the child can review the flight information and purchase the ticket as the credit card information (e.g., secure payment information) has already been entered. By default of the application or as set by the user, the credit card information may be encrypted (displayed via **** symbols for example). In some aspects, although the credit card information is encrypted, the credit card information functions as a valid entry for purchasing the ticket (e.g., the credit card information is encrypted to avoid their being displayed by the receiving application, but is a valid entry to the web page).

With reference to the above example, the user enters credit card information into the web page. The user performs a copy command that causes dynamic adjustment of the URL (e.g., a Copy Special action). The web browser detects that possibly sensitive information has been provide in a field and prompts the user with an option of omitting the sensitive information, submitting the sensitive information by encrypting the information in the data transfer from browser to browser and keeping the data encrypted when displayed in a receiving browser, or submitting the sensitive information by encrypting the information in the data transfer from browser to browser but displaying the information in the receiving browser. These options are provided by way of example. Other combinations of options, fewer options, more options, and so forth can be provided to the user.

As previously indicated, in one or more implementations, an application (e.g., web browser) can map information associated with each user input into a string to be utilized in forming the shared URL links. For example, the application can generate a string based on one or more of the user inputted data in the form field (e.g., a checked box, inputted text, slider input, etc.), type of form field, location of the form field on the web page, and so forth. Other parameters can be utilized to map, process, and display user the user inputted data by the application submitting the information (e.g., the web browser generating a shared URL link) and the application receiving the information (e.g. the web browser receiving and processing the shared URL link).

In one or more implementations, the shared URL links, such as the URL in address bar 245 and 285 of FIG. 2, are generally independent of a hierarchy (e.g., URL structure) associated with a website to which a web page belongs. The hierarchy can be, for example, a hierarchy as defined by HyperText Markup Language (HTML) code associated with the website. As previously indicated, a first user may fill in some or all fields in a web page and then try to share a URL of the web page (which might be the URL of the web page prior to filling in any fields) with another user. However, there are cases where some, perhaps all, of the information that is input into the web page is not shared with the other user because the information is saved elsewhere (e.g., a cookie in a computing device of the first user, JavaScript, and so forth) and not defined or otherwise not reflected in the URL.

As an example, for a website pertaining to booking flights, a first user provides as input to the website departure and arrival times of a flight and that hierarchy of the website may define different URLs for possible user inputs to specific input elements, including the departure and arrival information. The first user obtains a URL that includes the departure and arrival information, as defined in the hierarchy of the website. The URL, when processed by a web browser, will preserve the departure and arrival information. Hierarchy of the website might not be defined to include user inputs to other input elements however, such as search filters to add or remove criteria by which to search for an appropriate flight or flights for the first user. In such cases, the hierarchy of the website does not provide the first user with any URLs that the first user can share that would preserve user inputs related to these other input elements (e.g., the search filters). In accordance with one or more implementations of the subject disclosure, the shared URL link, when processed, can generate a web page not defined by the hierarchy of the website, where the generated web page preserves some or all of the input elements.

Figure 7:
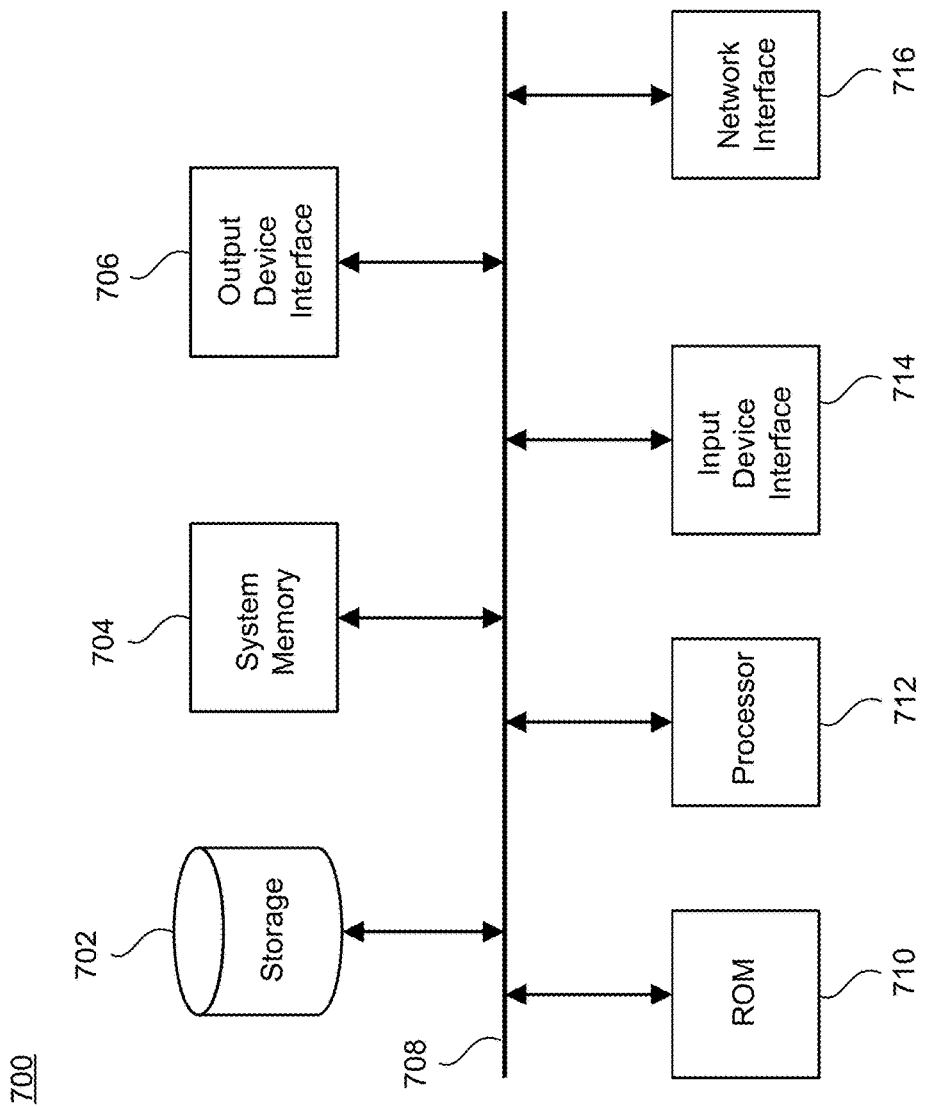
FIG. 7 conceptually illustrates an example electronic system with which some implementations of the subject technology can be implemented.

FIG. 7 conceptually illustrates an example electronic system with which some implementations of the subject technology can be implemented. Electronic system 700 can be a computer, phone, PDA, or any other sort of electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (for example, a magnetic or optical disk and its corresponding disk drive) as permanent storage device 702.

Other implementations use a removable storage device (for example, a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, or ROM 710. For example, the various memory units include instructions for displaying web pages, processing user entries to the web pages, and generating URLs, in accordance with some implementations. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, for example, cathode ray tubes (CRT) or liquid crystal displays (LCD). Some implementations include devices, for example, a touchscreen that functions as both input and output devices.

Finally, as shown in FIG. 7, bus 708 also couples electronic system 700 to a network (not shown) through a network interface 716. In this manner, the computer can be a part of a network of computers (for example, a local area network (LAN), a wide area network (WAN), or an Intranet, or a network of networks, for example, the Internet. Any or all components of electronic system 700 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method, comprising:
   displaying, in a web browser, a first web page associated with a first universal resource locator (URL), the first web page comprising a first input element;
   receiving a first user entry via the first input element;
   associating the received first user entry with the corresponding first input element;
   converting the received first user entry into a first string value; and
   generating, by the web browser, a second URL comprising the first URL and the first string value, wherein processing the second URL displays the first web page with the first input element filled-in.

2. The method of claim 1, wherein the first string value is a line of code that instructs filling in the first input element with the corresponding first user entry.

3. The method of claim 1, wherein generating the second URL comprises appending the first string value to the first URL.

4. The method of claim 1, wherein the string value is based on at least one of: the first user entry associated with the first input element corresponding to the string value, type of the first input element, and location of the first input element in the first web page.

5. The method of claim 1, wherein the first web page further comprises a second input element, and wherein the method further comprises:
   receiving a second user entry associated with the second input element; and
   associating the second user entry with the corresponding second input element.

6. The method of claim 5, further comprising:
   converting the second user entry into a second string value, wherein generating the second URL is further based on the second string value, and wherein the second user entry is encrypted in the second string value.

7. The method of claim 5, wherein the second user entry is omitted or defaults to a generic or arbitrary value in the second input element when the second URL is processed to display the first web page.

8. The method of claim 7, wherein the second input element is chosen by a user.

9. The method of claim 1, wherein the second URL is independent of a hierarchy associated with a website to which the first web page belongs.

10. The method of claim 1, wherein the first input element is a text input field, a checkbox, a slider, or a drop-down menu.

11. A system, comprising:
   one or more processors; and
   a non-transitory computer-readable medium comprising instructions stored therein, which when executed by the one or more processors, cause the one or more processors to perform operations comprising:
      displaying, in a web browser, a first web resource associated with a first universal resource locator (URL) in an application, the first web resource comprising a first input element;
      receiving a first user entry via the first input element;
      associating the received first user entry with the corresponding first input element;
      converting the received first user entry into a first string value; and
      generating, by the web browser, a second URL comprising the first URL and the first string value, wherein processing the second URL displays the first web resource with the first input element filled-in.

12. The system of claim 11, wherein the first string value in the second URL is a line of code that instructs filling in the first input element with the corresponding received first user entry.

13. The system of claim 11, wherein the first string value is based on at least one of: the first user entry associated with the first input element corresponding to the first string value, type of the first input element, and location of the first input element in the first web resource.

14. The system of claim 11, wherein the second web resource further comprises a second input element, and wherein the operations further comprise:
   receiving a second user entry associated with the second input element;
   associating the received second user entry with the corresponding second input element; and
   converting the second user entry into a second string value,
   wherein generating the second URL is further based on the second string value, and wherein the second user entry is encrypted in the second string value.

15. The system of claim 14, wherein the second input element is chosen by a user.

16. A non-transitory machine-readable medium comprising instructions stored therein, which when executed by a machine, cause the machine to perform operations comprising:
   displaying, in a web browser, a first web page associated with a first universal resource locator (URL) in an application, the first web page comprising a first input element;
   receiving a first user entry via the first input element;
   associating the received first user entry with the corresponding first input element;
   converting the received first user entry into a first string value; and
   generating, by the web browser, a second URL comprising the first URL and the first string value, wherein processing the second URL displays the first web page with the first input element filled-in.

17. The non-transitory machine-readable medium of claim 16, wherein the first string value is a line of code that instructs filling in the first input element with the corresponding first user entry.

18. The non-transitory machine-readable medium of claim 16, wherein the first web page further comprises a second input element, and wherein the operations further comprise:
   receiving a second user entry associated with the second input element; and
   associating the second user entry with the corresponding second input elemen,
   wherein the second user entry is omitted or defaults to a generic or arbitrary value in the second input element when the second URL is processed to display.

19. The non-transitory machine-readable medium of claim 18, wherein the second input element is chosen by a user.

* * * * *

UNITED STATES PATENT AND TRADEMARK OFFICE
CERTIFICATE OF CORRECTION

PATENT NO. : 10,445,413 B2
APPLICATION NO. : 15/893531
DATED : October 15, 2019
INVENTOR(S) : Martin Brandt Freund et al.

Page 1 of 1

It is certified that error appears in the above-identified patent and that said Letters Patent is hereby corrected as shown below:

In the Claims

Claim 18, Column 20, Line 44, "elemen" should read --element--.

Signed and Sealed this
Twenty-eighth Day of January, 2020

Andrei Iancu
*Director of the United States Patent and Trademark Office*